No. 650,141. Patented May 22, 1900.
R. V. WAGNER.
STATIC INDUCTION GENERATOR.
(Application filed Nov. 29, 1899.)
(No Model.)
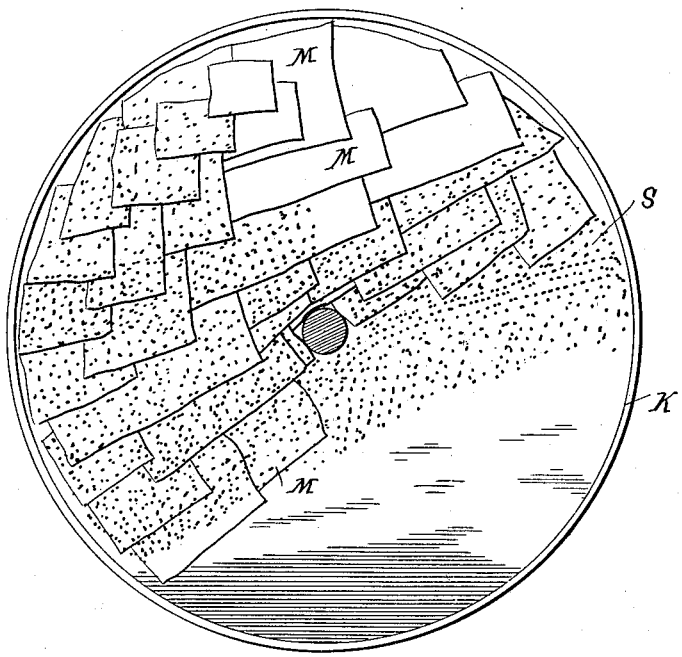
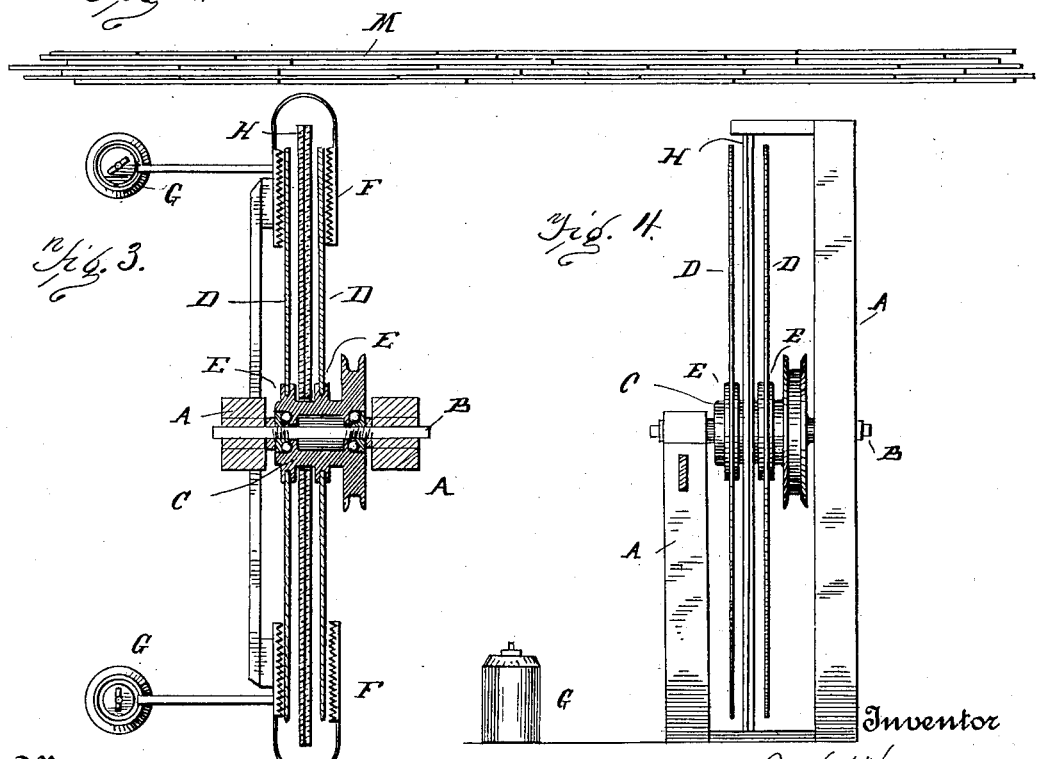
Witnesses
Charles K. Davis.
J. H. Eager.
Inventor
R. V. Wagner
By W. H. Bartlett
Attorney

UNITED STATES PATENT OFFICE.

ROME V. WAGNER, OF CHICAGO, ILLINOIS.

STATIC-INDUCTION GENERATOR.

SPECIFICATION forming part of Letters Patent No. 650,141, dated May 22, 1900.

Application filed November 29, 1899. Serial No. 738,671. (No model.)

*To all whom it may concern:*

Be it known that I, ROME V. WAGNER, a citizen of the United States, residing at Chicago, in the county of Cook and State of Illinois, have invented certain new and useful Improvements in Static-Induction Generators, of which the following is a specification, reference being had therein to the accompanying drawings.

This invention relates to electrical machines, and is more especially intended to apply to static-induction generators of electricity.

The object of the invention is to produce a machine in which the moving induction device shall be a very efficient non-conductor, not subject to the collection or condensation of moisture, as is glass, and of much greater strength than glass or hard rubber.

Figure 1 illustrates a plan of a mold for the production of a disk for a disk-machine, showing in the mold what are intended to represent flakes of mica and particles of pulverized shellac. Fig. 2 is a side elevation, enlarged, intended to show superposed and overlapping layers of mica as used in a disk of my static machine. Fig. 3 is a horizontal section showing the general arrangement of the essential parts of the static machine; and Fig. 4 is a side elevation, partly in section, of such static machine.

Referring to Figs. 3 and 4, A A represent standards which support shaft B, on which a hollow hub C is supported by ball-bearings. On this hub two disks D D are firmly held between clamp-plates E. The hub and disks can be rotated at a high speed by any suitable mechanism. Combs F are arranged on any suitable supports and connected by proper metallic connection to jars G. The glass plates H between the disks are supported from the frame in fixed position in any usual way.

The machine so far described may be varied in many particulars. It is merely an example of a convenient form of static machine, and the construction and arrangement of parts may be varied in many ways. In machines of this character glass is generally the material of the disks D. This is objectionable in a machine which must be driven at a high speed to secure high vibratory or oscillatory currents. Hard-rubber disks have also been used, but with unsatisfactory results where very high voltage is desired.

The disks D in my machine are constructed in the following manner: I take a shallow metallic mold or pan K of about the diameter of the proposed disk. Into this mold I sprinkle a thin film of powdered shellac S. I then arrange several layers of thin sheets of mica, the edges of the sheets overlapping in shingle fashion. Between the layers of mica sheets the pulverized shellac is dusted in, so that there is substantially a film of shellac interposed between contiguous sheets or layers of mica. A presser or plunger is then applied to the upper face of the plates, and the mold is heated to a degree needful to melt the shellac. The shellac when melted will flow between the layers or films of mica and any excess of the shellac will pass away. The melted shellac will form a cement which fills the interstices of the mold and when cold cements the sheets into a compact disk of great strength and toughness. The action of the presser or plunger and mold on the disk is to expel all the excess of shellac while the latter material is in molten or fluid state, so that no more of this gum is left in the disk than is needful to act as a filler and binding agent. The interstices and unevennesses of the plates or sheets of mica will be thoroughly filled, however, and the disk when completed will be smooth and compact.

It is desirable to split the mica down to the thinnest possible films. These are almost of necessity uneven in area. The layers can be arranged with edges overlapping, and the powdered shellac is dusted on as the work progresses. It is probable that a similar result might be reached by dipping the mica plates or sheets in melted shellac and when cold lay the same in a mold shingle fashion; but I prefer the use of powdered shellac, as there is but little air-space left as the work progresses. The irregularities at the hub and rim of the disk are filled by the flow of the molten shellac, so that a very perfect disk is produced in the mold.

It will be understood that the surface of a cylinder might be covered with a film or plate of shellac and mica for use in cylinder-machines.

In disk-machines the disks I have made of mica and shellac in the manner described do not deteriorate with age and have proved far stronger than glass or hard-rubber disks and may be driven at a speed which would break the latter from the centrifugal action. As the volume and character of the electric force produced depend largely on the speed of movement of the generator, I have been able to produce a larger volume with the same number of disks than by any other machine known to me. Moreover, the disk so constructed seems to be proof against the condensation of moisture, and I am able to use such machines under conditions where a machine with a glass disk could not be used.

For machines requiring great power the number of disks may be increased to any extent. I am able to make much larger disks than can be used of glass with any degree of safety.

What I claim is—

1. In a static-induction generator, the combination with usual driving, supporting, and collecting mechanism, of a disk composed of mica and shellac, substantially as described.

2. A disk for static electric machines, composed of layers or laminæ of mica with overlapping edges, cemented and having the interstices filled with solidified shellac, substantially as described.

3. In static machines, the rotating generator having the induction-surface covered with mica and shellac, arranged substantially as described.

In testimony whereof I affix my signature in presence of two witnesses.

ROME V. WAGNER.

Witnesses:
E. A. PAUL,
W. A. BARTLETT.